United States Patent
Wallace (10) Patent No.: US 8,601,701 B2
(45) Date of Patent: Dec. 10, 2013

(54) APPARATUS AND METHOD FOR CONTROLLING OR PROGRAMMING A MEASUREMENT ROUTINE

(75) Inventor: David Sven Wallace, Nympsfield (GB)

(73) Assignee: Renishaw PLC, Wotton-under-Edge (GB)

( * ) Notice: Subject to any disclaimer, the term of this patent is extended or adjusted under 35 U.S.C. 154(b) by 500 days.

(21) Appl. No.: 12/450,937

(22) PCT Filed: Apr. 22, 2008

(86) PCT No.: PCT/GB2008/001428
§ 371 (c)(1),
(2), (4) Date: Oct. 19, 2009

(87) PCT Pub. No.: WO2008/129301
PCT Pub. Date: Oct. 30, 2008

(65) Prior Publication Data
US 2011/0192042 A1 Aug. 11, 2011

(30) Foreign Application Priority Data
Apr. 23, 2007 (GB) .................................. 0707720.9

(51) Int. Cl.
*G01B 5/008* (2006.01)
(52) U.S. Cl.
USPC ........................................................ 33/503
(58) Field of Classification Search
USPC ........................................................ 33/503
See application file for complete search history.

(56) References Cited

U.S. PATENT DOCUMENTS

| | | | |
|---|---|---|---|
| 3,478,436 A | 11/1969 | Barnes | |
| 3,678,584 A | 7/1972 | Dolan | |
| 4,631,834 A * | 12/1986 | Hayashi et al. | 33/503 |
| 5,189,806 A | 3/1993 | McMurtry et al. | |
| 5,212,646 A * | 5/1993 | McMurtry | 700/161 |
| 5,222,034 A | 6/1993 | Shelton et al. | |
| 5,251,156 A * | 10/1993 | Heier et al. | 702/167 |
| 5,465,221 A | 11/1995 | Merat et al. | |
| 5,517,190 A | 5/1996 | Gunn | |
| 5,675,902 A | 10/1997 | Chase | |
| 5,726,917 A | 3/1998 | Staaden | |

(Continued)

FOREIGN PATENT DOCUMENTS

| | | |
|---|---|---|
| CN | 1748187 A | 3/2006 |
| DE | 100 50 795 A1 | 7/2001 |

(Continued)

OTHER PUBLICATIONS

U.S. Appl. No. 12/673,114, filed in the name of Anderson et al. on Feb. 11, 2010.

(Continued)

*Primary Examiner* — Christopher Fulton
(74) *Attorney, Agent, or Firm* — Oliff & Berridge, PLC (57) ABSTRACT

A method and apparatus for controlling or programming a measurement path for a probe mounted on a coordinate positioning apparatus (e.g. an articulating probe head mounted on a CMM) which enables both the position of the probe tip and the orientation of the probe to be varied. In a first mode, the position of the probe tip is adjusted. In a second mode the orientation of the probe is adjusted, while keeping the location of the probe tip unchanged. This may be achieved either online on the coordinate positioning apparatus or offline in software.

20 Claims, 11 Drawing Sheets

(56) References Cited

U.S. PATENT DOCUMENTS

| | | | |
|---|---|---|---|
| 6,115,927 A | 9/2000 | Hendrix | |
| 6,154,713 A | 11/2000 | Peter et al. | |
| 6,158,136 A | 12/2000 | Götz et al. | |
| 6,307,084 B1 | 10/2001 | Matsuki et al. | |
| 6,400,998 B1 | 6/2002 | Yamazaki et al. | |
| 6,460,261 B1 | 10/2002 | Noda et al. | |
| 6,868,356 B2 | 3/2005 | Nai et al. | |
| 7,350,310 B2* | 4/2008 | Lloyd et al. | 33/559 |
| 7,395,606 B2 | 7/2008 | Crampton | |
| 7,420,588 B2 | 9/2008 | Asano et al. | |
| 7,456,538 B2 | 11/2008 | Nai et al. | |
| 7,533,574 B2 | 5/2009 | McMurtry et al. | |
| 7,783,445 B2 | 8/2010 | McLean et al. | |
| 7,809,523 B2* | 10/2010 | Hunter et al. | 702/168 |
| 7,971,365 B2* | 7/2011 | Hunter et al. | 33/503 |
| 8,255,184 B2 | 8/2012 | Chang et al. | |
| 2002/0174555 A1* | 11/2002 | McMurtry et al. | 33/502 |
| 2003/0014156 A1 | 1/2003 | Hashimoto et al. | |
| 2005/0132591 A1* | 6/2005 | Kojima et al. | 33/503 |
| 2005/0171733 A1 | 8/2005 | Hough | |
| 2007/0032951 A1 | 2/2007 | Tanenhaus et al. | |
| 2011/0119025 A1* | 5/2011 | Fetter et al. | 702/152 |
| 2012/0041712 A1* | 2/2012 | Pettersson | 702/151 |

FOREIGN PATENT DOCUMENTS

| | | |
|---|---|---|
| EP | 0 879 674 A1 | 11/1998 |
| JP | A-10-300455 | 11/1998 |
| JP | B2-2873404 | 1/1999 |
| JP | A-2000-074661 | 3/2000 |
| JP | A-2000-304528 | 11/2000 |
| JP | A-2002-071345 | 3/2002 |
| JP | A-2003-1576 | 1/2003 |
| JP | A-2003-300183 | 10/2003 |
| JP | A-2004-093190 | 3/2004 |
| WO | WO 90/07097 | 6/1990 |
| WO | WO 03/099526 A1 | 12/2003 |
| WO | WO 2004/072740 A2 | 8/2004 |
| WO | WO 2005/060338 A2 | 7/2005 |
| WO | WO 2006/114570 A1 | 11/2006 |
| WO | WO 2008/129301 A2 | 10/2008 |

OTHER PUBLICATIONS

Harris et al.; "A Review of On-Line and Off-Line Programming Facilities for Coordinate Measuring Machines;" *Advanced Factory Automation*; 1994; pp. 581-585.

Medeiros et al.; "Off-Line Programming of Coordinate Measuring Machines Using a Hand-Held Stylus," *Journal of Manufacturing Systems*; 1994; pp. 401-411; vol. 13; No. 6.

Feb. 28, 2012 Office Action issued in European Patent Application No. 08 788 387.2.

Limaiem et al.; "Integrated Accessibility Analysis and Measurement Operations Sequencing for CMMs;" *Journal of Manufacturing Systems*; 2000; pp. 83-93; vol. 19; No. 2.

Lim et al.; "CMM feature accessibility and path generation;" *International Journal of Production Research*; 1994; pp. 597-618; vol. 32; No. 3.

Spitz et al.; "Accessibility Analysis Using Computer Graphics Hardware;" *IEEE Transactions on Visualization and Computer Graphics*; 2000; pp. 208-219; vol. 6; No. 3.

Son et al.; "Automated laser scanning system for reverse engineering and inspection;" *International Journal of Machine Tools and Manufacture*; 2002; pp. 889-897; vol. 42; No. 8.

Rao et al.; "On local gouging in five-axis sculptured surface machining using flat-end tools;" *Computer Aided Design*; 2000; pp. 409-420; vol. 32; No. 7.

International Search Report for International Application No. PCT/GB2008/002823, issued Jan. 13, 2009.

Written Opinion of the International Searching Authority for International Application No. PCT/GB2008/002823, issued Jan. 13, 2009.

British Search Report for Application No. 0716218.3, issued Nov. 12, 2007.

Translation of Japanese Office Action dated Sep. 2, 2011 issued in Japanese Patent Application No. 2008-508276.

"Generation of CMM Probe Path and Its Simulation in NC Verifying Environment," Mechanical Science and Technology, Mar. 2000, vol. 19, No. 2, pp. 269-271 & 280.

Chinese Office Action dated Jan. 29, 2012 issued in Chinese Patent Application No. 200880112360.3 (with translation).

Translation of: "The Generation of CMM Measurement Pathways and their Simulation in NC Measurement Environments" (Mechanical Science and Technology, vol. 19, No. 2, Mar. 2000, pp. 269-271 & p. 280).

Jun. 21, 2012 Office Action issued in U.S. Appl. No. 12/673,114.

Xi et al., "CAD-based path planning for 3-D line laser scanning," *Computer-Aided Design*, 31, 1999, pp. 473-479.

Quan et al., "Cutting path planning for ruled surface impellers," *Chinese Journal of Aeronautics*, 21, 2008, pp. 462-471.

Martins et al., "Automated 3D surface scanning based on CAD model," *Mechatronics*, 15, 2005, pp. 837-857.

Newman et al., "A survey of automated visual inspection," *Computer Vision and Image Understanding*, vol. 61, No. 2, 1995, pp. 231-262.

Ailisto, "CAD model-based planning and vision guidance for optical 3D coordinate measurement," *VTT Publications*, 298, 1997, pp. 5-70.

Lin et al., "CAD-based CMM dimensional inspection path planning—a generic algorithm," *Robotica*, vol. 19, 2001, pp. 137-148.

Ainsworth et al., "CAD-based measurement path planning for free-form shapes using contact probes," International Journal of Advanced Manufacturing Technology, 2000, vol. 16, pp. 23-31.

May 31, 2013 Office Action issued in Chinese Patent Application No. 200880112360.3 (with translation).

Dec. 6, 2012 Chinese Office Action issued in Patent Application No. 200880112360.3 (with Translation).

PH9 and PH9A Automated Inspection System User's Guide, Dec. 31, 1990.

Mar. 26, 2013 Office Action issued in U.S. Appl. No. 12/673,114.

Jul. 19, 2013 Office Action issued in Japanese Patent Application No. 2010-521474 (with translation).

\* cited by examiner

APPARATUS AND METHOD FOR CONTROLLING OR PROGRAMMING A MEASUREMENT ROUTINE

The present invention relates to apparatus and method for controlling or programming a measurement routine for the measurement of an object using a measurement probe mounted on a coordinate positioning apparatus. In particular the invention is suitable for a probe mounted on an articulating probe head capable of rotational motion about two axes which is mounted on a coordinate measuring machine (CMM), machine tool and the like, or a measurement probe measured directly on an apparatus providing both linear and rotational motion, such as a manual coordinate measuring arm, inspection robot etc.

It is common practice after workpieces have been produced, to inspect them on a coordinate measuring machine (CMM) or other type of coordinate positioning apparatus having a quill onto which a measurement probe is mounted which can be driven in three orthogonal directions X, Y, Z within a working volume of the machine.

U.S. Pat. No. 5,189,806 describes an articulating probe head capable of orientating a probe with two degrees of freedom to enable the probe to be used in an operation for scanning the surface of workpieces. In general such a probe head includes two rotary drive mechanisms which enable a probe to be orientated about two substantially orthogonal rotary axes. Such an articulating probe head may be mounted on the quill of a CMM to enable the probe tip to be positioned in 5 degrees of freedom (i.e. 3 linear degrees of freedom provided by the CMM and 2 rotary degrees of freedom provided by the articulating probe head).

When a workpiece is to be measured by the probe, the measurement path along which the path will move must be programmed. This may be done by mounting the workpiece on the CMM (or other coordinate positioning apparatus) and using a joystick to move the probe to discrete positions along the desired measurement path. These positions are saved and used to create subsequent measurement paths. When the probe is mounted on an articulating probe head which is in turn mounted on a CMM, movement of both the probe head and CMM may be controlled by a controller. The joystick may be provided with two modes; a first mode for moving the quill of the CMM and a second mode for controlling the articulating probe head to change the angle of the head.

A first aspect of the present invention provides a method for controlling or programming a measurement path for a probe mounted on a coordinate positioning apparatus which enables both the position of the probe tip and the orientation of the probe to be varied, the method comprising the steps of:
(a) adjusting the position of the probe tip or a representation of the probe tip;
(b) adjusting the orientation of the probe or a representation of the probe whilst keeping the location of the probe tip substantially unchanged.

The coordinate positioning apparatus may comprise the combination of several, e.g. two, individual coordinate positioning apparatuses. For example one apparatus providing linear motion and another providing rotational motion. One of said two or more individual coordinate positioning apparatuses may comprise an articulating probe head, typically having two or more axes of rotation. The articulating probe head may be mounted on another coordinate positioning apparatus, such as a coordinate measuring machine (CMM). The coordinate positioning apparatus may comprise a single apparatus which provides both linear and rotational motion, for example a robotic arm.

In a first embodiment of the invention, the method is carried out on a coordinate positioning apparatus, and the method comprises the additional step of:
placing an object to be inspected on the coordinate positioning apparatus;
and wherein step (a) comprises positioning the probe tip at a desired location with respect to the object.

Step (b) may be used to ensure appropriate alignment of the longitudinal axis of the probe.

In a second embodiment of the invention, the method is carried out in software, and the position of the probe tip and angle of the probe in steps (a) and (b) are adjusted with respect to a 3D model (e.g. CAD) of an object.

In this method the position of the moveable parts of the coordinate positioning apparatus, for example an articulating probe head and movable parts of a coordinate measuring machine, are determined for positions of the probe tip and probe orientation and it is determined whether a collision would occur between the either the coordinate positioning apparatus or probe and the object.

Preferably a signal is generated when a collision would occur.

Preferably this method is implemented by a computer program when run on a computer.

The method may include the step of selecting the position of the probe tip or representation of the probe tip and the orientation of the probe or representation of the probe chosen in steps (a) and (b) as an input used to create the measurement path. The selected position of the probe tip and probe angle or representation of the probe tip and probe angle may comprise a 'measurement point' at which a measurement will be taken or a 'via point' through which the measurement path will move.

A second aspect of the present invention provides a method for programming a measurement path for a probe mounted on a coordinate positioning apparatus which enables both the position of the probe tip and the orientation of the probe to be varied, comprising the steps of:
(a) placing an object on the coordinate positioning apparatus;
(b) positioning a handheld device with its tip at the desired position of the probe tip and its longitudinal axis at the desired orientation of the probe;
(c) selecting the position of the tip and orientation of the longitudinal axis chosen in step (b);
(d) using the selected position of the tip and angle of the longitudinal axis as the position of the probe tip and probe orientation of a point on the measurement path.

A third aspect of the present invention provides apparatus for controlling or programming a measurement path for a probe mounted on a coordinate positioning apparatus which enables both the position of the probe tip and the orientation of the probe to be varied, the apparatus comprising:
a controller for sending demand signals to the coordinate positioning apparatus;
a user interface capable of sending an output to the controller, the user interface having two or more modes;
wherein the controller adjusts the position of the probe tip in response to a first mode;
and wherein the controller adjusts the orientation of the probe in response to a second mode, such that the location of the probe tip is substantially unchanged.

Preferably an output from the user interface to the controller is used to select the position of the probe tip and the angle of the probe as a point on a measurement path:

Preferably the user interface comprises a joystick. The user interface may also comprise a keyboard, for example.

A fourth aspect of the present invention provides a computer programme for programming a measurement path for a probe mounted on a coordinate positioning apparatus which enables both the position of the probe tip and the orientation of the probe to be varied, the computer programme comprising code adapted to perform the following steps when executed on a computer:

(a) combining a 3D model of the part and a 3D model of the coordinate positioning apparatus in the same coordinate frame;
(b) adjusting the position of the model of the coordinate positioning apparatus in response to an input in a first control mode in order to adjust the position of the probe tip within the 3D model;
(c) adjusting the position of the model of the coordinate positioning apparatus in response to an input in a second control mode, to adjust the orientation of the probe such that the location of the probe tip remains unchanged within the 3D model;
(d) selecting the probe tip position and probe orientation selected in steps (b) and (c) in response to a selection input Preferably the computer programme is provided on a carrier, such as a CD, USB stick or other medium, which when loaded onto a computer carries out the invention. The computer program may also be downloaded directly from the internet.

Preferably a signal is generated when a collision would occur.

A fifth aspect of the present invention comprises a hand-held device for programming a measurement path for a probe mounted on a coordinate positioning apparatus which enables both the position of the probe tip and the orientation of the probe to be varied, the hand-held device comprising:

a body having a longitudinal axis and a workpiece contacting tip;
a sensor for determining the position of the tip and angle of the longitudinal axis within a coordinate frame;
an output for outputting the position data.

Preferably the hand-held device further comprising an input, which on receiving an input records or outputs the position data.

Preferred embodiments of the invention will now be described by way of example with reference to the accompanying drawings wherein.

It is known from International Patent Application No. WO90/07097 to mount a motorised articulating probe head on a coordinate measuring machine. The articulating probe head enables a probe or stylus mounted on the articulating probe head to be rotated about two orthogonal axes. Thus the probe or stylus may be positioned angularly about these: two axes whilst the articulating probe head can be positioned by the coordinate positioning machine in any position within the working volume of the machine.

Such an articulating probe head provides a coordinate positioning machine with greater scanning flexibility because the articulating probe head can position the probe or stylus in many different orientations.

Figure 1:
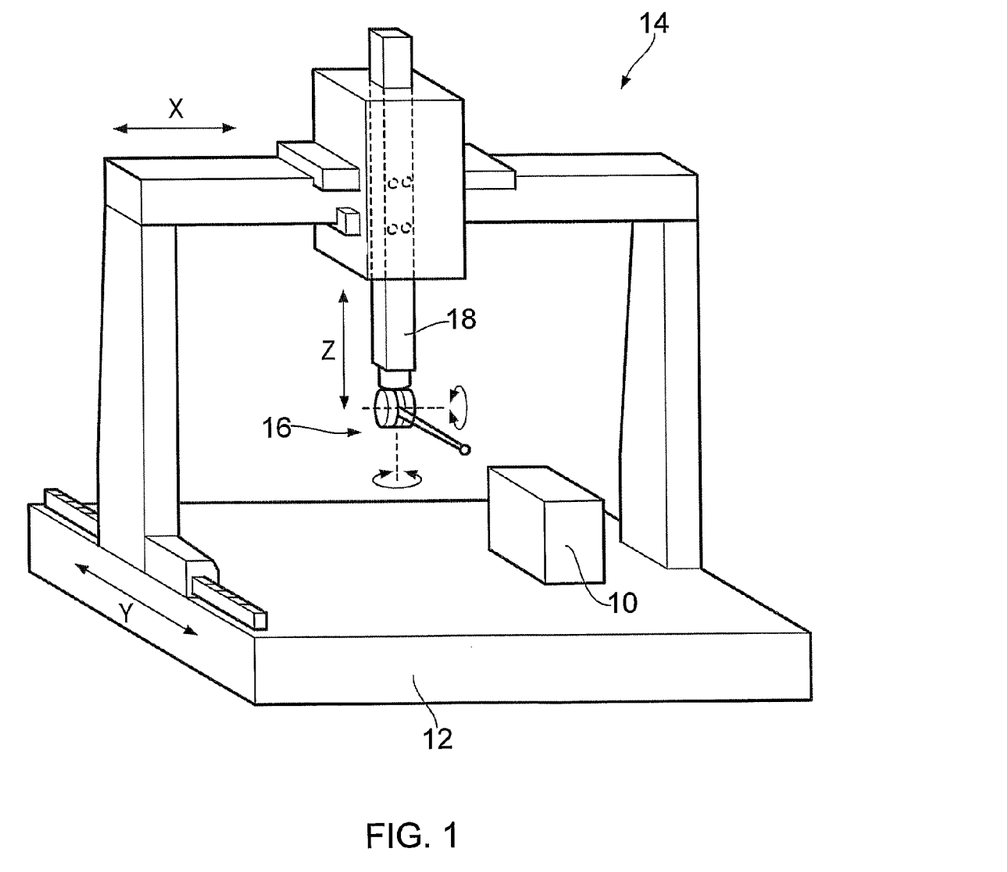
FIG. 1 is a perspective view of a coordinate measuring machine.

FIG. 1 illustrates an articulating probe head mounted on a coordinate measuring machine (CMM). A workpiece 10 to be measured is mounted on a table 12 of the CMM 14 and a articulating probe head 16 is mounted on a quill 18 of the CMM 14. The quill is driveable in three directions X, Y, Z relative to the table by motors in a known manner.

Figure 2:
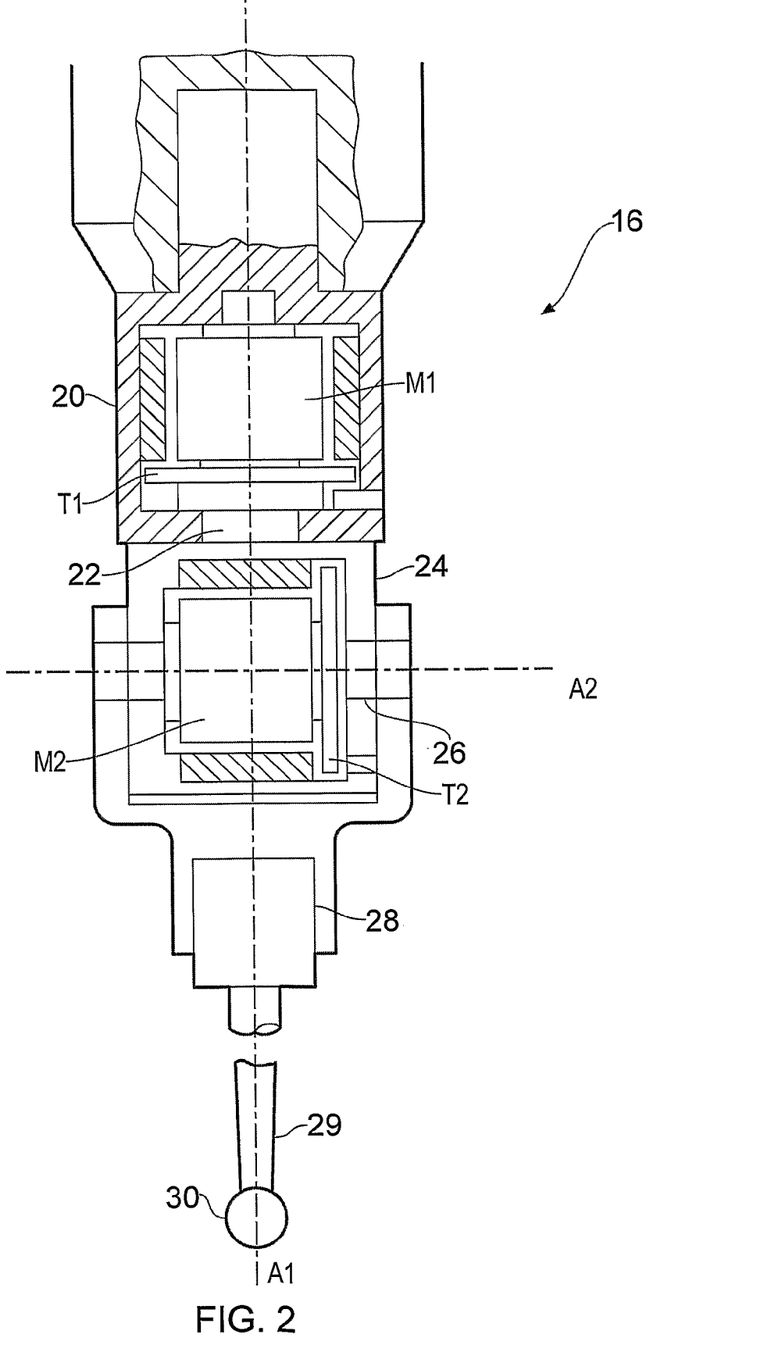
FIG. 2 is a cross section of an articulating head.

As illustrated in FIG. 2, the articulating probe head 16 comprises a fixed part formed by a base or housing 20 supporting a movable part in the form of a shaft 22 rotatable by a motor M1 relative to the housing 20 about an axis A1. The shaft 22 is secured to a further housing 24 which in turn supports a shaft 26 rotatable by a motor M2 relative to the housing 24 about an axis A2 perpendicular to the axis A1.

A probe 28 with a stylus 29 having a workpiece contacting tip 30 is mounted onto the articulating probe head. The arrangement is such that the motors M1, M2 of the articulating probe head can position the workpiece-contacting tip angularly about the axes A1 or A2 and the motors of the CMM can position the articulating probe head linearly anywhere within the three-dimensional coordinate framework of the CMM to bring the stylus tip into a predetermined relationship with the surface being scanned.

The articulating probe head may be provided with a third axis which allows a probe mounted on it to be rotated about it's own axis.

In such a three axis articulating probe head an additional or separate motor may be used to rotate the probe about its own axis.

Linear position transducers (not shown) are provided on the CMM for measuring linear displacement of the articulating probe head and angular position transducers T1 and T2 are provided in the articulating probe head for measuring angular displacement of the stylus about the respective axes A1 and A2.

The probe may be a contact probe having a deflectable stylus. In a touch trigger probe, deflection of the stylus causes an output which latches the position of the coordinate positioning apparatus at which the trigger occurred. For a scanning probe, transducers in the probe measure the amount of stylus deflection. Alternatively a non contact probe may be used (for example an optical, capacitance or inductance probe). The probe may be one dimensional (e.g. a non-contact probe which senses distance from surface), two dimensional (e.g. a contact probe sensing deflection in X and Y) or three dimensional (e.g. a contact probe sensing deflection in X, Y and Z).

On a vertical arm CMM as shown in FIG. 1, the A1 axis of the articulating probe head 16 is nominally parallel to the CMM Z axis (which is along the spindle 18). The articulating probe head may rotate the probe continuously about this axis. The A2 axis of the articulating probe head is orthogonal to its A1 axis.

When a part is to be measured, the measurement path which is to be followed by the measurement apparatus must be programmed. This may be done either 'online' or 'offline'.

Online programming of the measurement path will now be described with reference to FIGS. 3-5. In online path programming, the path is programmed by placing the part on the table of the CMM and moving the measurement apparatus around the part. Typically a user interface, such as a joy stick is used to move the measurement apparatus. Different modes enable the joystick to move either the CMM quill or control the angles of the articulating probe head.

Figure 3:
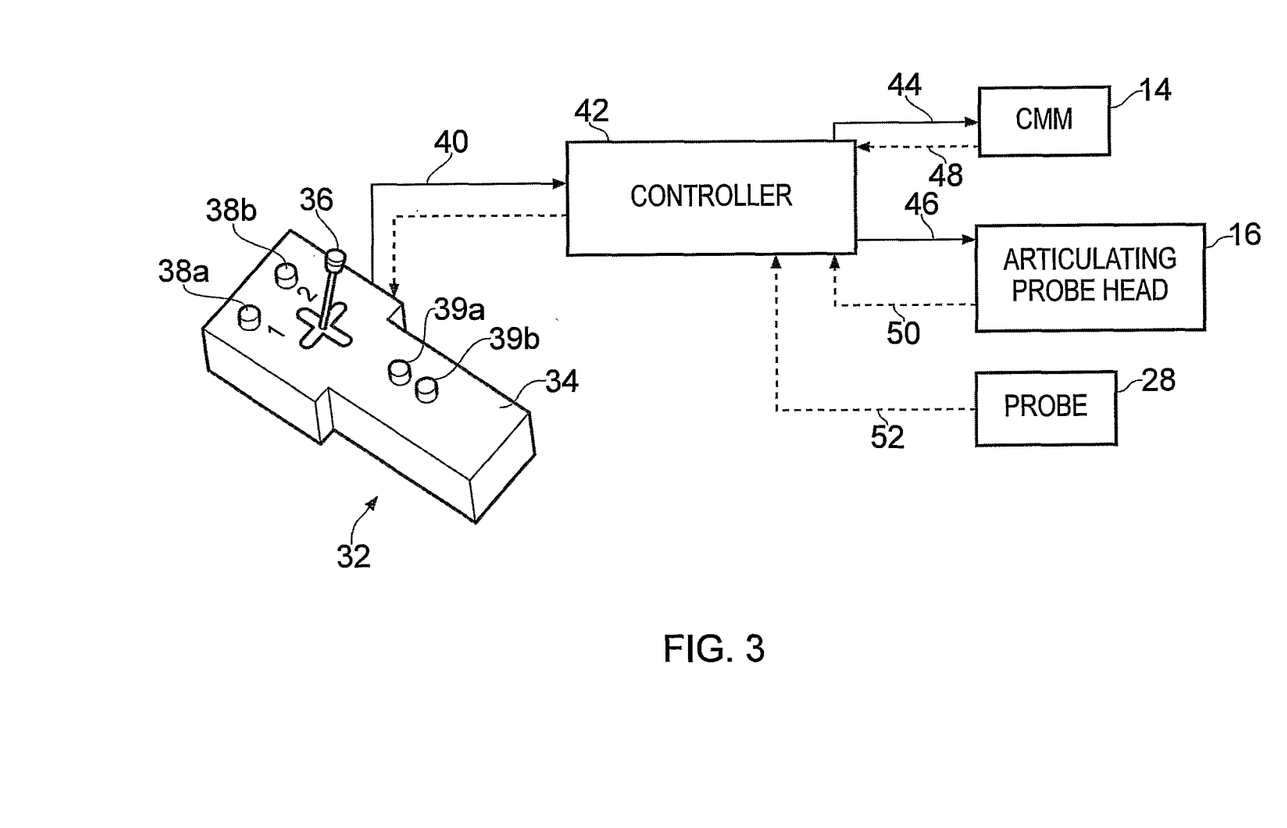
FIG. 3 is a schematic illustration of a joystick, controller and measuring apparatus.

FIG. 3 illustrates the joystick 32 which has a body 32 and a stick 36. Mode selection buttons 38a, 38b are provided on the body 32 to enable the user to select the desired mode. A position selection button 39 is provided to enable the user to select a probe position. This buttons 39 enables via points to be selected (as will be described in more detail below).

The joystick 32 has an output 40 to a controller 42. The controller 42 may comprise for example a PC or CMM controller. The controller 42 has outputs 44, 46 to the CMM 14 and articulating probe head 16 through which it can send demand signals to the motors of the CMM and articulating probe head to control their positions. The controller 42 has inputs 48, 50, 52 from the CMM, articulating probe head and probe respectively which provides position information from the transducers in these parts. From these inputs, the controller can determine the position of the workpiece contacting tip of the probe stylus.

Figure 4A:
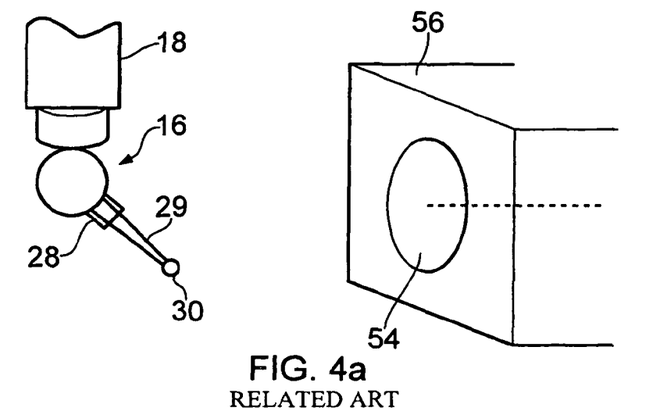
FIGS. 4A-4C are perspective views of the position of a probe mounted on an articulating head with respect to a horizontal bore.
Figure 4B:
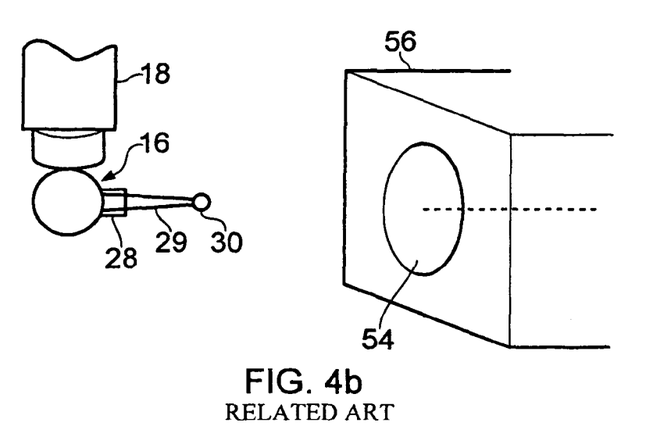
Figure 4C:
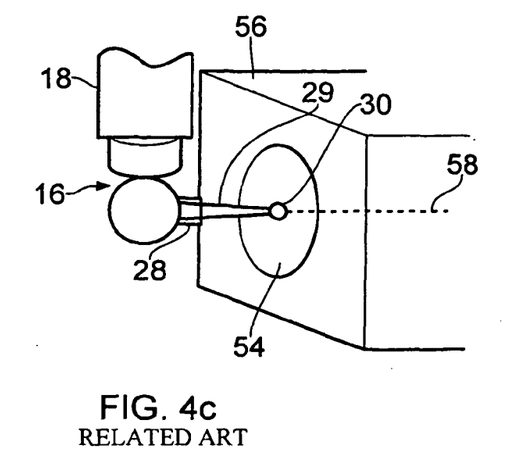

FIGS. 4A-4C illustrate the steps of a known method for positioning the stylus relative to a part which includes a horizontal bore 54. In FIG. 4A, the stylus tip is at the wrong position and the stylus is at the wrong angle. The joystick is used in one mode to adjust the articulating probe head angles until the stylus 29 is parallel to the centre line 58 of the bore 54 as shown in FIG. 4B. The joystick is then switched into a separate mode and used to adjust the position of the quill 18. FIG. 4C shows the stylus positioned along the centre line of the bore. The stylus tip can thus be bought into contact with internal surfaces of the bore 54.

Measurements, are taken of discrete points on the internal surface of the bore which enables the feature type (in this case a circle), orientation and dimensions to be determined. From this data, a measurement path can be calculated.

During the adjustment of the head angles, care must be taken that no part of the stylus collides with the surface. Therefore, several iterations tend to be used in positioning the quill and head angles to avoid the stylus tip becoming too close to the surface.

In the present invention, two different modes are created. In a first mode, the position of the CMM quill is adjusted in three dimensions whilst the head angles remain stationary, to thereby adjust the stylus tip position. Alternatively, the first mode may entail adjustment of the articulating probe head, about the two rotary axes whilst the CMM quill remains stationary, which also has the effect of adjusting the stylus tip position.

In the second mode, the stylus tip position remains stationary whilst the stylus angle is adjusted. Adjustment of the stylus angle requires movement in some or all of the two axes of the articulating probe head and three axes of the CMM.

By using the two modes of the present invention, the stylus tip can easily be adjusted to the desired position and angle.

Thus to place the stylus tip at a desired position and angle, only two adjustments are required. The first mode is used to position the stylus tip and the second mode is used to adjust the stylus angle. No further iterations are required.

Figure 5A:
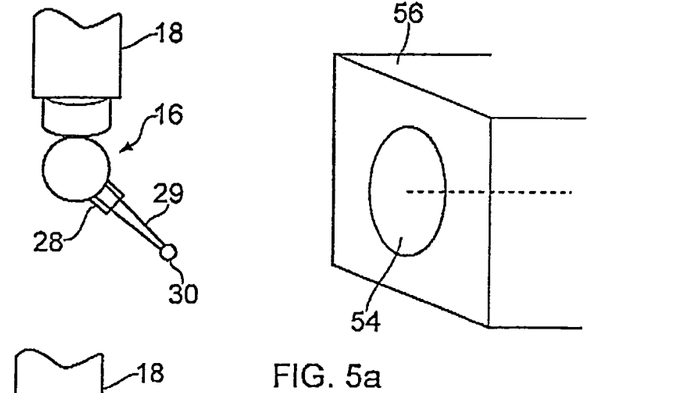
FIGS. 5A-5C are perspective views of the positions of a probe-mounted on an articulating head with respect to a horizontal bore according to the present invention.
Figure 5B:
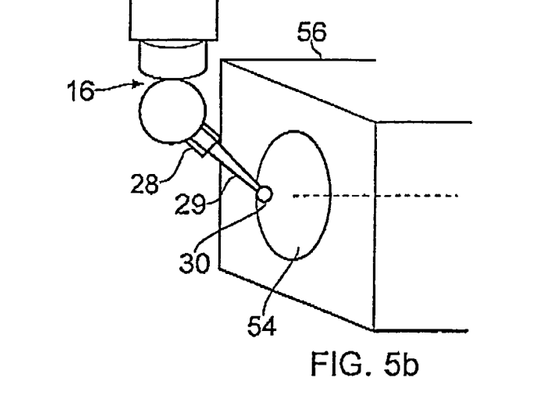
Figure 5C:
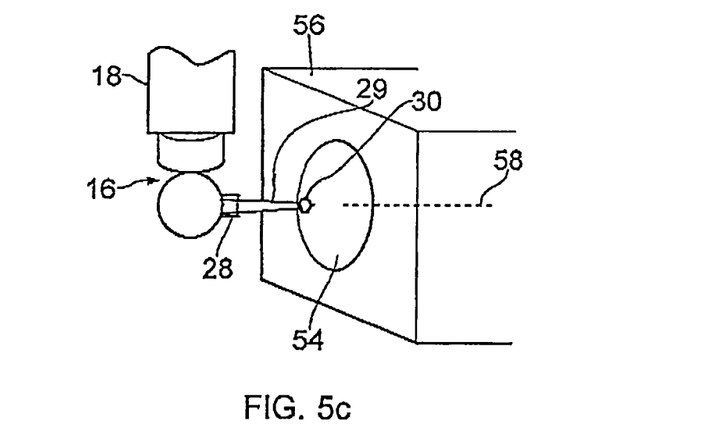

FIGS. 5A-5C illustrate the steps of positioning the stylus relative to a horizontal bore 54 according to the present invention. In FIG. 5A the stylus tip is in the wrong position and the stylus is at the wrong angle. The joystick is used in a first mode to adjust the position of the quill 18 and thereby place the stylus tip 30 in the desired position in the centre of the bore. In FIG. 5C the joystick is used in a second mode to move both the quill 18 and the articulating probe head 16 to adjust the angle of the stylus 29 without moving the stylus tip 30. The stylus is now correctly positioned with the stylus tip 30 in the surface of the bore 54 and the longitudinal axis of the probe aligned along the centre line 58 of the bore 54.

The joystick has a button or other input (see 39 in FIG. 2), which enables the user to select 'via' points (i.e. points, not on the surface, which the measurement path will move through). The discrete measurement points taken of the surface are used to calculate a measurement path incorporating measurement points.

This invention is also suitable for controlling the probe tip position and probe orientation via the joystick for measurement of an object.

Although FIG. 3 illustrates the use of a joystick for on-line programming, other control devices may also be used. Alternatively, a computer keyboard can be used, possibly in combination with a mouse or trackball.

The controller may be provided with a 'snap' function. The controller may receive a position input from the joystick and output demands to the nearest predetermined value. For example, the stylus orientation may be demanded to the nearest 5°. This snap function may be enabled by the joystick sending an output to the controller, such as the joystick being released, causing the controller to enter the snap mode and move the articulating probe head to the nearest angle (in this example the nearest 5°)

The invention is suitable for both contact and non contact probes (e.g. optical, capacitance and inductance probes). For non contact probes, a measurement is typically taken when the probe tip is at a threshold distance from the surface. Therefore, as with a contact probe, discrete measurement points of the surface are input automatically into the controller for calculating the measurement path whereas via points must be selected via the joystick.

The measurement path can be planned in software, rather than using a joystick. This is referred to as 'off-line part programming' and will be described with reference to FIGS. 6-7.

Figure 6A:
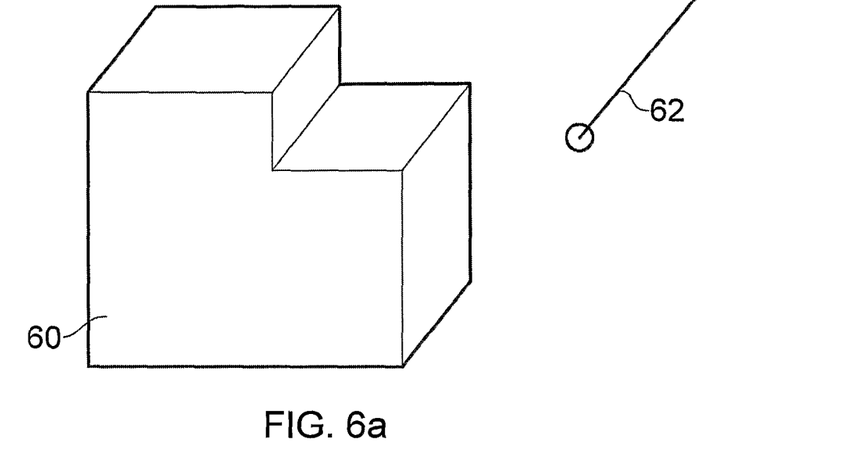
FIGS. 6A-6C are views of a CAD model of a part and a representation of a probe.
Figure 6B:
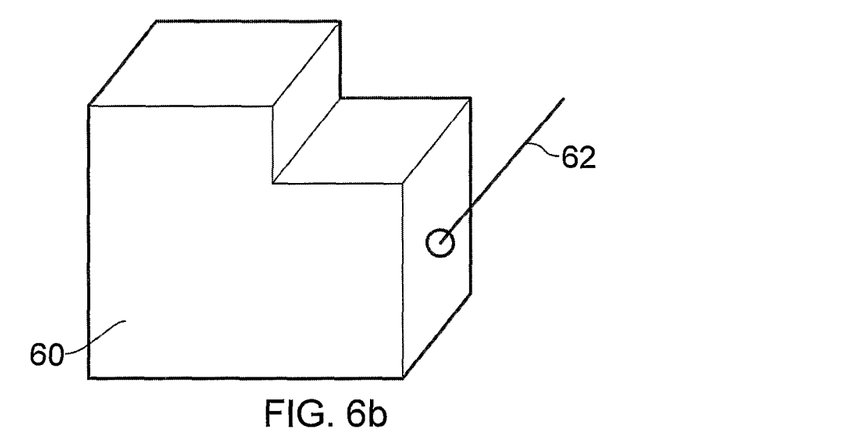
Figure 6C:
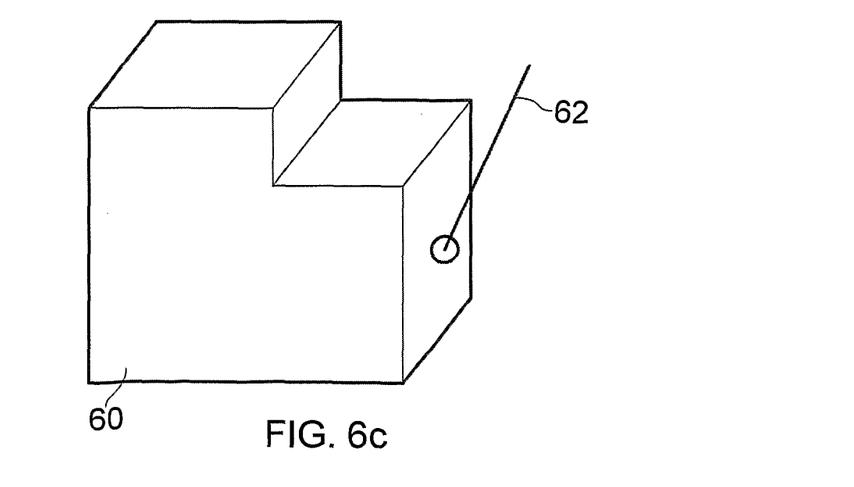

FIGS. 6A-C illustrates a CAD model of a part 60 and a representation of the probe 62. Other representations of the measuring apparatus, e.g. comprising quill, articulating probe head and probe or simply a vector showing the stylus position and angle may be used. FIG. 6A shows the probe out of contact with the CAD model of the part. As with online part programming two modes are provided to adjust the stylus tip position and angle respectively. As before the first mode adjusts the stylus tip position by moving the quill. FIG. 6B illustrates the representation of the probe 62 now in contact with the CAD model 60, with the same angle as in FIG. 6A. Alternatively the first mode could comprise moving the stylus tip by adjustment of the articulating probe head.

The second mode adjusts the stylus angle by moving both the quill and articulating probe head. FIG. 6C shows the representation of the probe 62 has changed angle whilst the point of contact remains the same as in FIG. 6B.

The user can select modes and adjust the position of the representation of the probe by an interface such as a keyboard, joystick, mouse or trackball. The user can select the measurement points or via points which have the desired stylus tip position and angle.

The user may be able to select between a subset of the available axes (e.g. 3 axis motion provided by the CMM or 2 axis motion provided by the articulating probe head) or the full set of available axes (e.g. 5 axis motion provided by both CMM and articulating probe head). This selection between may be made by a variety of inputs. For example the user may click on icons on the screen or the image of the desired measurement apparatus (e.g. CMM for 3 axis motion, articulating probe head for 5 axis motion or probe for 2 axis motion). Alternatively, the user may select modes by using the keyboard. When in a selected mode, a mouse, trackball, keyboard or other input is used to move the selected measurement apparatus (according to the mode) relative to the 3D model of the part.

When path planning, it is important to avoid collision between the part and the measuring apparatus. This is particularly the case with an inclined part, when vertical movement of the measuring apparatus may collide with the incline.

Figure 7:
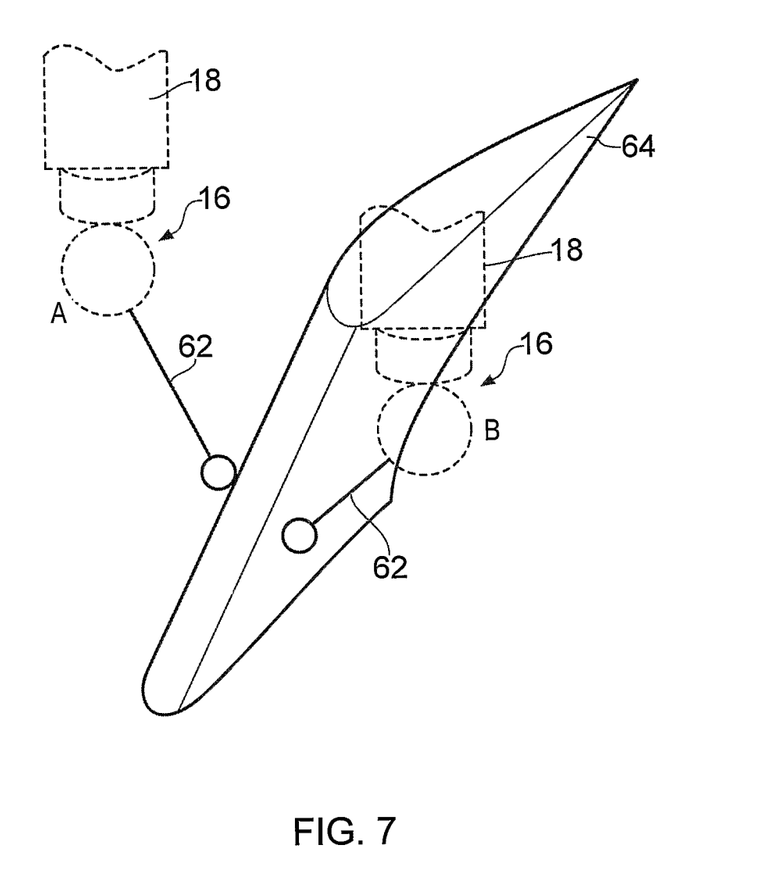
FIG. 7 is a view of a CAD model of an inclined part.

FIG. 7 illustrates a CAD model of an inclined part 64. Representations of the probe 62 are shown in two places—positions A and B. The locations of the articulating probe head 16 and quill 18 required to position the probe in these positions are illustrated in dashed outline. It can be seen that at A there is adequate clearance but at B a collision could result. To inform the user of the risk of collision, a warning is created. For example the CAD model may change colour, or an audible warning may be produced.

Figure 8:
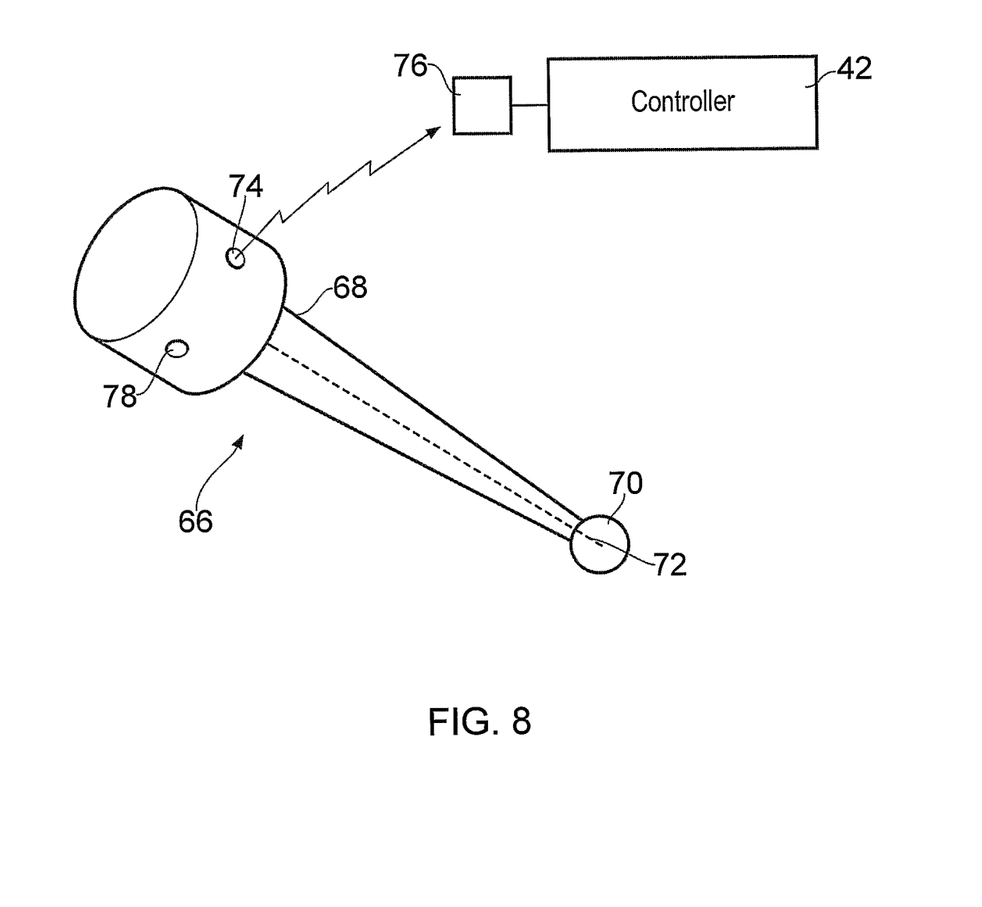
FIG. 8 is a perspective view of a handheld device.

In an alternative embodiment, a hand-held device is used to mimic the position of the probe. This device may be used to set stylus tip position and stylus angle for points on the measurement path. Such a hand-held device 66 is illustrated in FIG. 8 and comprises a body 68 with a workpiece contacting tip 70 and a longitudinal axis 72. It also includes apparatus to enable both its position and orientation to be determined. It may include accelerometers, may use cameras or ultrasonic equipment, for example as disclosed in US2007032951. The hand-held device may have a surface provided with an illuminated pattern, for example a pattern of LEDs. Two cameras may be provided at an angle from one another in the working volume of which the hand-held device will be used. The illuminated pattern is detected by the two cameras and the two images are used to determine the position and orientation of the hand-held device. Such a system of determining the coordinate position of a probe provided with electromagnetic emitters using cameras and a computer is described in U.S. Pat. No. 6,115,927. A commercially available probe which uses light emitters to determine its position is manufactured by Leica Geosystems and is known as the Leica T probe.

Figure 11:
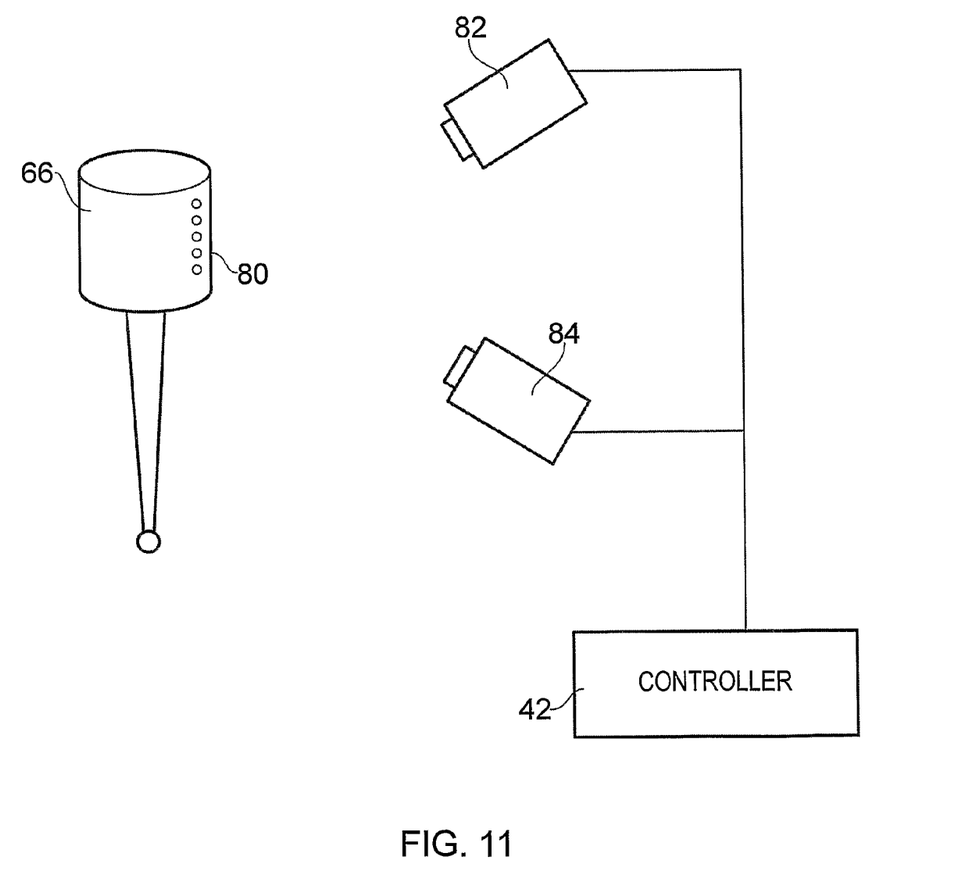
FIG. 11 is a perspective view of the handheld device of FIG. 8 and cameras.

FIG. 11 illustrates the hand-held device 66 of FIG. 8, showing an array of LEDs 80 located on the body of the coordinate positioning apparatus. Two cameras 82, 84 are located on the machine body, spaced apart and angled relative to one another, both directed towards the device. Outputs from the cameras 82, 84 are sent to the controller 42 which uses the data to determine the position and orientation of the device.

The hand-held device may also be rotated about its longitudinal axis to mimic a third axis of the articulating probe head, in which it provides rotation of the probe about it's longitudinal axis.

The hand-held device also has communication apparatus, such as optical, radio or communication via a wire to communicate its position to a controller or pc. An optical transmitter 74 is shown in the body which communicated with an optical receiver 76 connected to the controller 42.

The user may place the hand-held device around the part along the measurement path. A button 78 or other input is provided to allow the user to select whether a measurement point or via point is required. When the button is pressed, both the position of the tip and the orientation is recorded and output via the communication apparatus.

The user may thus easily program how much 'lean' and 'lead' is required. 'Lean' is the angle of the probe from the surface vertical. 'Lead' is the angle of the probe from the direction of travel.

Figure 9A:
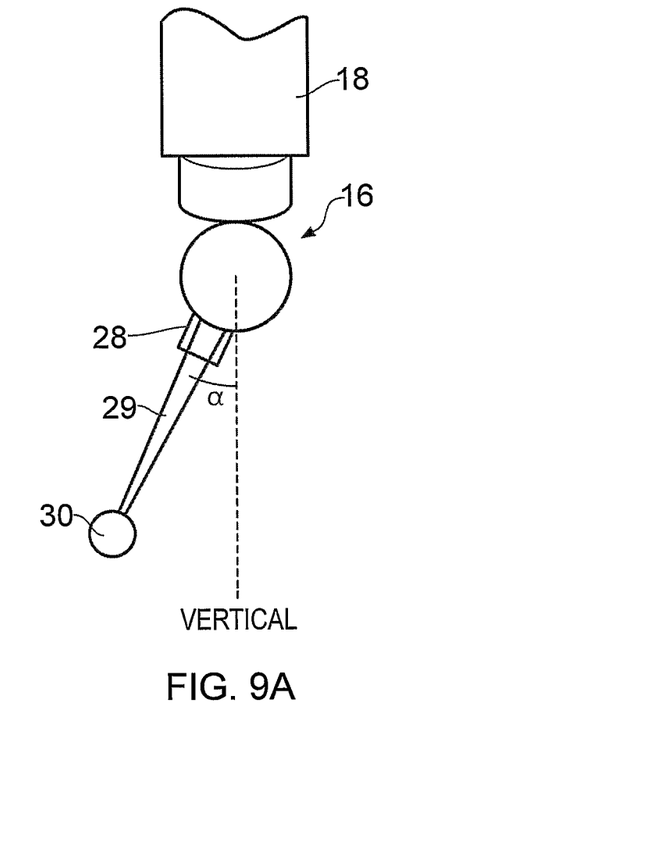
FIGS. 9A-9B are side and plan views of a probe mounted on an articulating head showing lean and lead angles.
Figure 9B:
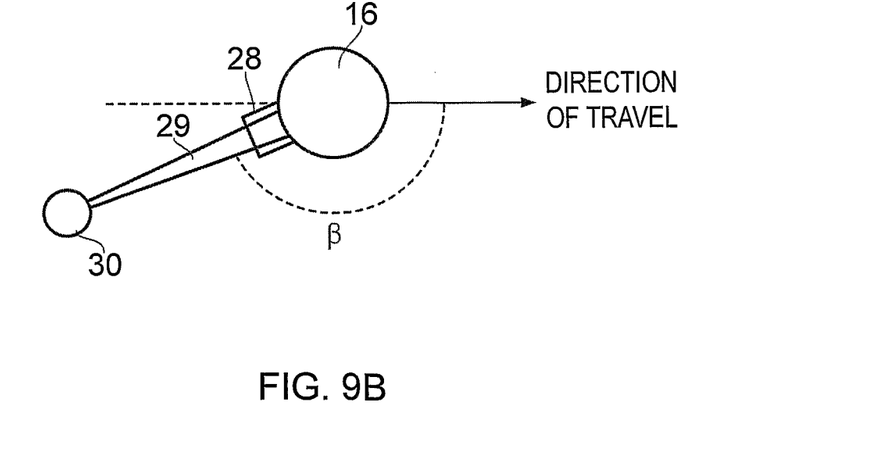

FIGS. 9A and 9B illustrate a side and plan view of a probe mounted on an articulating probe head respectively. FIG. 9A shows that the probe is α° from the vertical—this is the lean angle. FIG. 9B shows that the probe is β° from the direction of travel—this is the lead angle.

Figure 10:
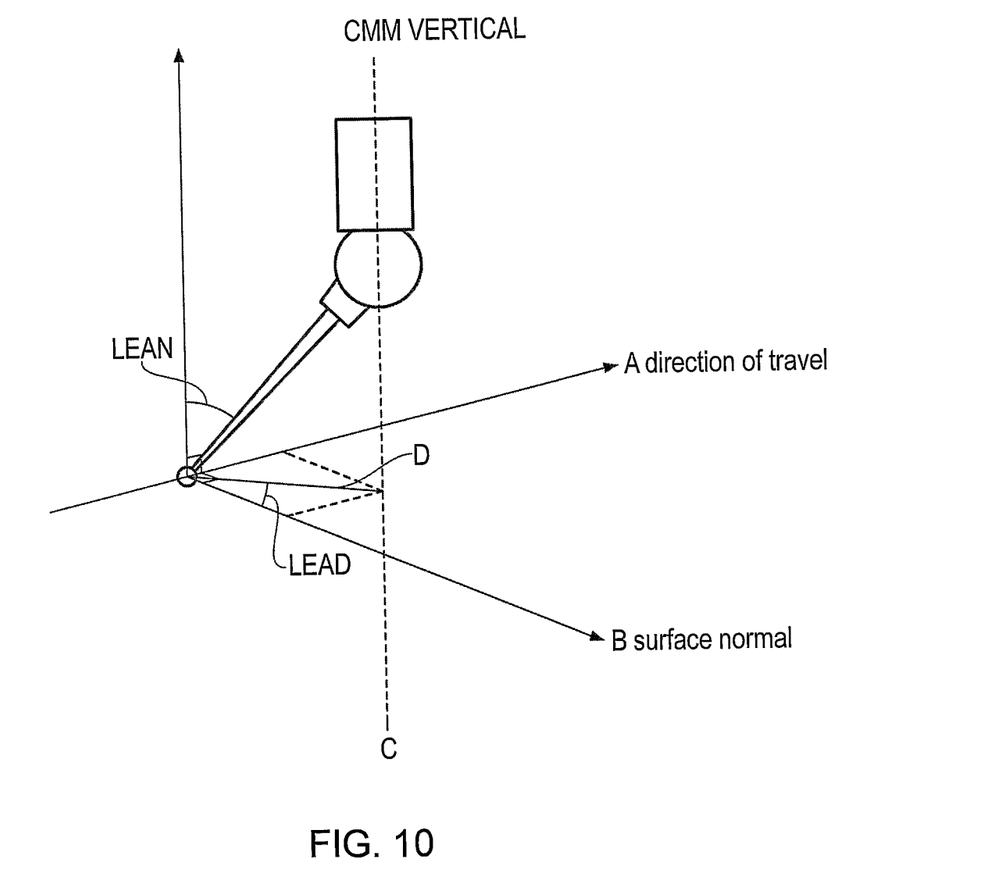
FIG. 10 illustrates the lean and lead angles.

FIG. 10 shows the lean and lead angles in more detail. A probe mounted on an articulating probe head is illustrated, moving in a direction A. The surface normal B and CMM vertical C are also shown. A line D is drawn extending from the probe tip to the CMM vertical. C; line D is in the plane of direction of travel A and surface normal B. The angle between line D and the surface normal B is the lead angle. The angle between the longitudinal axis of the probe and the CMM vertical is the lean angle.

The software in the controller or pc will be provided with a set of rules, governing a range of optimal lean and lead angles. The optimal angles closest to the actual angles which the user holds the hand-held device are selected.

Although the above description describes the use of an articulating probe head on a coordinate measuring machine, the invention is also suitable for a probe mounted on other coordinate positioning apparatus which enables the position of the probe tip or orientation of the probe to be adjusted. Such a coordinate positioning apparatus may comprise a combination of apparatuses, such as an articulating probe head mounted on a CMM (as described) or machine tool. Alternatively, the coordinate positioning apparatus may comprise one piece of apparatus which can both position and orient the probe, e.g. a robotic arm. In all of these apparatus the same considerations of moving the probe tip about a part without collision apply.

The invention claimed is:

1. A method for controlling or programming a measurement path for a probe mounted on an articulating head, which is mounted on a quill of a coordinate positioning apparatus which enables a position of a probe tip to be varied and an orientation of the probe to be varied angularly about at least one axis, the method comprising the steps of:
   (a) a user manipulating a user interface operating in a first mode to adjust the position of the probe tip or a representation of the probe tip so as to place the probe tip at a desired position; and
   (b) the user manipulating the user interface operating in a second mode to adjust the orientation of the probe or a representation of the probe, in which during such adjustment of the orientation, the quill of the coordinate positioning apparatus is moved about the probe tip in order to keep a location of the probe tip substantially unchanged at the desired position.

2. The method according to claim 1, wherein the method is carried out on a coordinate positioning apparatus, the method further comprising:
   placing an object to be inspected on the coordinate positioning apparatus, wherein
      step (a) comprises positioning the probe tip at the desired position with respect to the object.

3. The method according to claim 1, wherein the method is carried out in software, and the position of the probe tip and the orientation of the probe in steps (a) and (b) are adjusted with respect to a 3D model of an object.

4. The method according to claim 3, further comprising:
   determining required positions of movable parts of the coordinate positioning apparatus to achieve said positions of the probe tip and probe orientation; and
   determining whether a collision will occur between either the coordinate positioning apparatus or the probe and the object.

5. The method according to claim 4, wherein a signal is generated when it is determined that the collision will occur.

6. The method according to claim 3, wherein the method is implemented by a computer program when run on a computer.

7. The method according to claim 1, further comprising:
   selecting the position of the probe tip or the representation of the probe tip and the orientation of the probe or the representation of the probe chosen in steps (a) and (b) as an input used to create the measurement path.

8. The method according to claim 7, wherein the selected position of the probe tip and the probe orientation or the representation of the probe tip and the probe orientation comprises a 'measurement point' at which a measurement will be taken or a 'via point' through which the measurement path will move.

9. The method according to claim 1, wherein the position of the probe tip can be varied angularly about at least two axes that are orthogonal to one another.

10. The method according to claim 1, wherein the user interface comprises at least one of a joystick, a mouse and a trackball.

11. The method according to claim 1, wherein the orientation of the probe can be varied angularly about at least two axes.

12. The method according to claim 1, wherein during the adjustment of the orientation, an angle between a center of the probe tip and the at least one axis is changed whilst keeping the location of the probe tip substantially unchanged at the desired position.

13. An apparatus for controlling or programming a measurement path for a probe mounted on an articulating head, which is mounted on a quill of a coordinate positioning apparatus which enables a position of a probe tip to be varied and an orientation of the probe to be varied angularly about at least one axis, the apparatus comprising:
   a controller configured to send demand signals to the coordinate positioning apparatus;
   a user interface configured to send an output to the controller, the user interface having two or more modes, wherein
      the controller adjusts the position of the probe tip in response to a user manipulating the user interface operating in a first mode to place the probe tip at a desired position, and
      in response to the user manipulating the user interface operating in a second mode, the controller adjusts the orientation of the probe, in which during such adjustment of the orientation, the quill of the coordinate positioning apparatus is moved about the probe tip in order to keep a location of the probe tip substantially unchanged at the desired position.

14. The apparatus according to claim 13, wherein an output from the user interface to the controller is used to select the position of the probe tip and the orientation of the probe as a point on the measurement path.

15. The apparatus according to claim 13, wherein the user interface comprises a joystick.

16. The apparatus according to claim 13, wherein the position of the probe tip can be varied angularly about at least two axes that are orthogonal to one another.

17. The apparatus according to claim 13, wherein during the adjustment of the orientation, an angle between a center of the probe tip and the at least one axis is changed whilst keeping the location of the probe tip substantially unchanged at the desired position.

18. A non-transitory computer-readable storage medium on which is stored a computer program for programming a measurement path for a probe mounted on an articulating head, which is mounted on a quill of a coordinate positioning apparatus which enables a position of a probe tip to be varied and an orientation of the probe to be varied angularly about at least one axis, the computer program comprising code adapted to perform the following steps when executed on a computer:
   (a) combining a 3D model of a part and a 3D model of the coordinate positioning apparatus in the same coordinate frame;
   (b) adjusting a position of the 3D model of the coordinate positioning apparatus in response to a user manipulating a user interface operating in a first control mode in order to adjust the position of the probe tip within the 3D model to place the probe tip at a desired position;
   (c) adjusting the position of the 3D model of the coordinate positioning apparatus in response to the user manipulating the user interface operating in a second control mode, to adjust the orientation of the probe, in which during such adjustment of the orientation, the quill of the coordinate positioning apparatus is moved about the probe tip in order to keep a location of the probe tip unchanged within the 3D model at the desired position; and
   (d) selecting the position of the probe tip and the orientation of the probe selected in steps (b) and (c) in response to a selection input.

19. The non-transitory computer-readable storage medium according to claim 18, wherein the position of the probe tip can be varied angularly about at least two axes that are orthogonal to one another.

20. The non-transitory computer-readable storage medium according to claim 18, wherein during the adjustment of the orientation, an angle between a center of the probe tip and the at least one axis is changed whilst keeping the location of the probe tip substantially unchanged at the desired position.

* * * * *